(12) United States Patent
Endo

(10) Patent No.: US 9,749,571 B2
(45) Date of Patent: Aug. 29, 2017

(54) IMAGING APPARATUS AND IMAGING SYSTEM

(71) Applicant: CANON KABUSHIKI KAISHA, Tokyo (JP)

(72) Inventor: Toshiaki Endo, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/172,687

(22) Filed: Jun. 3, 2016

(65) Prior Publication Data

US 2016/0373675 A1 Dec. 22, 2016

(30) Foreign Application Priority Data

Jun. 17, 2015 (JP) .................................. 2015-121766

(51) Int. Cl.
- *H04N 5/365* (2011.01)
- *H04N 5/374* (2011.01)
- *H04N 5/378* (2011.01)
- *H04N 5/3745* (2011.01)

(52) U.S. Cl.
CPC .......... *H04N 5/378* (2013.01); *H04N 5/3658* (2013.01); *H04N 5/37452* (2013.01); *H04N 5/37455* (2013.01)

(58) Field of Classification Search
None
See application file for complete search history.

(56) References Cited

U.S. PATENT DOCUMENTS

| | | | | |
|---|---|---|---|---|
| 9,049,389 | B2* | 6/2015 | Hashimoto | H04N 5/353 |
| 2008/0192127 | A1* | 8/2008 | Sakai | H04N 5/378 |
| | | | | 348/222.1 |
| 2010/0253821 | A1* | 10/2010 | Yamamoto | H03K 4/02 |
| | | | | 348/294 |
| 2013/0206961 | A1* | 8/2013 | Ikeda | H01L 27/14601 |
| | | | | 250/208.1 |
| 2013/0258131 | A1* | 10/2013 | Hashimoto | H04N 5/225 |
| | | | | 348/222.1 |
| 2014/0184844 | A1* | 7/2014 | Muto | H04N 5/355 |
| | | | | 348/222.1 |
| 2015/0181146 | A1* | 6/2015 | Hashimoto | H04N 5/378 |
| | | | | 348/229.1 |
| 2015/0244388 | A1* | 8/2015 | Hashimoto | H03M 1/34 |
| | | | | 348/322 |

FOREIGN PATENT DOCUMENTS

JP  2009-130828  6/2009

* cited by examiner

*Primary Examiner* — Shahbaz Nazrul
(74) *Attorney, Agent, or Firm* — Fitzpatrick, Cella, Harper & Scinto

(57) ABSTRACT

Provided is an imaging apparatus, including: a first and a second A/D conversion units converting signals output from a first and a second groups of columns of pixels, respectively; a first reference signal supply unit supplying, to the first A/D conversion unit, at least one of reference signals having a first and a second change rates per time; a second reference signal supply unit supplying, to the first A/D conversion unit, at least one of reference signals having a third and a fourth change rate per time; and an adjusting unit adjusting at least one of the first to fourth change rates so that at least one of a difference in change rate per time between the first and the third change rate, and a difference in change rate per time between the second and the fourth change rate is reduced.

12 Claims, 8 Drawing Sheets

IMAGING APPARATUS AND IMAGING SYSTEM

BACKGROUND OF THE INVENTION

Field of the Invention

The present invention relates to an imaging apparatus and an imaging system.

Description of the Related Art

An imaging apparatus is known in which an analog-to-digital (A/D) conversion circuit configured to convert an analog signal into a digital signal through comparison between an analog signal read out from a pixel and a reference signal (ramp signal) is arranged correspondingly to each pixel column. In such an imaging apparatus, a technology is also known in which the value of the digital signal after the A/D conversion is made variable through changing the slope of the ramp signal.

In Japanese Patent Application Laid-Open No. 2009-130828, there is disclosed a technology configured to correct a difference in slope among ramp signals due to wiring lengths of ramp signal lines through adjustment of a gain of a pixel signal or a ramp signal to suppress shading that appears in an output image.

In an imaging apparatus disclosed in Japanese Patent Application Laid-Open No. 2009-130828, due to process variations in resistance values and capacitance values in amplifier circuits, there is a limit to the extent of improvement of precision of the gain adjustment. Further, in Japanese Patent Application Laid-Open No. 2009-130828, there is no disclosure of a correction of a difference in slope when a technology in which the slope of a ramp signal is variable is used.

Further, when a plurality of ramp signals having different slopes are used to perform A/D conversion, a configuration is conceivable in which the slope of a ramp signal is changed by capacitance division. However, in this configuration, the slopes of ramp signals supplied to the respective column circuits may vary due to process variations of the capacitance value or the like. This results in variations in the signal level after the A/D conversion among columns, which may be a cause of noise, e.g., vertical stripes in an output image.

SUMMARY OF THE INVENTION

According to one aspect of the present invention, there is provided an imaging apparatus, including: a pixel array including a plurality of pixels arranged in rows and columns; a first A/D conversion unit, which is arranged correspondingly to a first group of the columns of the pixels in the pixel array, and is configured to perform A/D conversion of an analog signal that is output from each of the corresponding pixels to a digital signal by comparing the analog signal with a first reference signal having a potential that changes with a predetermined change rate per time; a second A/D conversion unit, which is arranged correspondingly to a second group of the columns of the pixels in the pixel array, and is configured to perform A/D conversion of an analog signal that is output from each of the corresponding pixels to a digital signal by comparing the analog signal with a second reference signal having a potential that changes with a predetermined change rate per time; a first reference signal supply unit configured to supply, to the first A/D conversion unit, as the first reference signal, at least one of a reference signal having a first change rate per time and a reference signal having a second change rate per time that is smaller than the first change rate; a second reference signal supply unit configured to supply, to the second A/D conversion unit, as the second reference signal, at least one of a reference signal having a third change rate per time and a reference signal having a fourth change rate per time that is smaller than the third change rate; and an adjusting unit configured to adjust at least one of the first change rate, the second change rate, the third change rate, and the fourth change rate so that at least one of a difference in change rate per time between the first change rate and the third change rate, and a difference in change rate per time between the second change rate and the fourth change rate is reduced.

According to another aspect of the present invention, there is provided an imaging system, including: an imaging apparatus; and a signal processing unit configured to generate an image based on a signal output from the imaging apparatus, in which the imaging apparatus includes: a pixel array including a plurality of pixels arranged in rows and columns; a first A/D conversion unit, which is arranged correspondingly to a first group of the columns of the pixels in the pixel array, and is configured to perform A/D conversion of an analog signal that is output from each of the corresponding pixels to a digital signal by comparing the analog signal with a first reference signal having a potential that changes with a predetermined change rate per time; a second A/D conversion unit, which is arranged correspondingly to a second group of the columns of the pixels in the pixel array, and is configured to perform A/D conversion of an analog signal that is output from each of the corresponding pixels to a digital signal by comparing the analog signal with a second reference signal having a potential that changes with a predetermined change rate per time; a first reference signal supply unit configured to supply, to the first A/D conversion unit, as the first reference signal, at least one of a reference signal having a first change rate per time and a reference signal having a second change rate per time that is smaller than the first change rate; a second reference signal supply unit configured to supply, to the second A/D conversion unit, as the second reference signal, at least one of a reference signal having a third change rate per time and a reference signal having a fourth change rate per time that is smaller than the third change rate; and an adjusting unit configured to adjust at least one of the first change rate, the second change rate, the third change rate, and the fourth change rate so that at least one of a difference in change rate per time between the first change rate and the third change rate, and a difference in change rate per time between the second change rate and the fourth change rate is reduced.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. Like components are denoted by like reference symbols throughout the drawings, and descriptions of overlapping components are sometimes omitted.

First Embodiment

Figure 1:
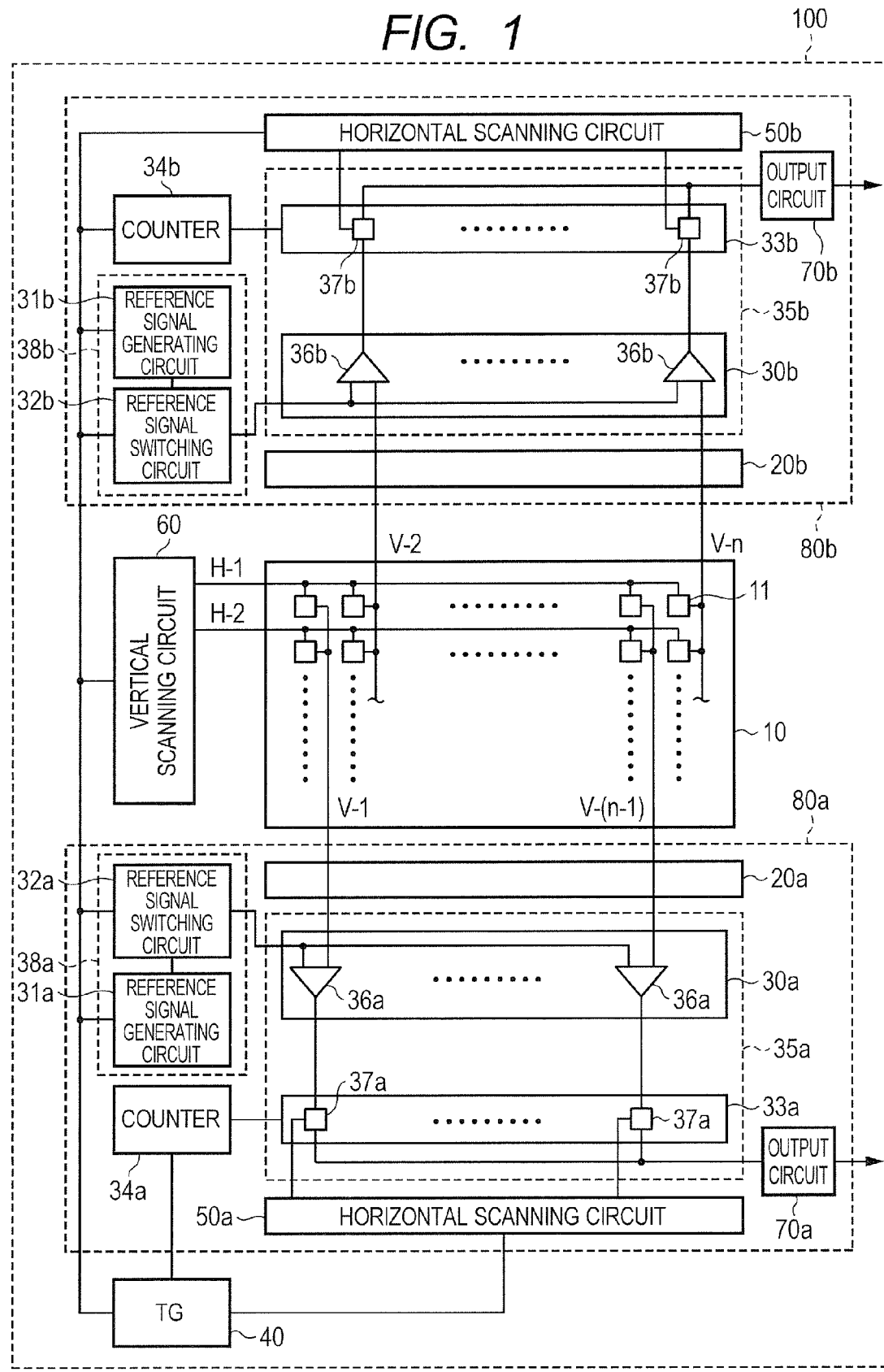
FIG. 1 is an illustration of a configuration of an imaging apparatus according to a first embodiment of the present invention.

FIG. 1 is an illustration of a configuration of an imaging apparatus according to a first embodiment of the present invention. An imaging apparatus 100 includes a pixel array 10, a timing generator (TG) 40, a vertical scanning circuit 60, and readout circuits 80a and 80b.

The pixel array 10 has a plurality of pixels 11 arranged in (m rows)×(n columns). The pixel array 10 includes row control lines H-1, H-2, ..., H-m arranged for the respective rows and vertical signal lines V-1, V-2, ..., V-n arranged for the respective columns. The vertical scanning circuit 60 supplies a control signal to the respective rows of pixels 11 via the row control lines H-1, H-2, ..., H-m. The respective pixels 11 output analog signals obtained through photoelectric conversion of incident light to vertical signal lines to which the respective pixels 11 are connected. Each of the row control lines H-1, H-2, ..., H-m is illustrated as one wiring, but in reality, may be formed of a plurality of wirings for transmitting a plurality of control signals.

The vertical signal lines V-1, ..., V-(n−1) connected to odd-numbered columns of the pixels 11 are connected to the readout circuit 80a, while the vertical signal lines V-2, ..., V-n connected to even-numbered columns of the pixels 11 are connected to the readout circuit 80b. However, it is not essential that the respective columns of the pixels 11 be alternately connected to the readout circuit 80a and the readout circuit 80b as described above. It is enough that part of the columns of the pixels 11 in the pixel array 10 are connected to the readout circuit 80a and the rest of the columns of the pixels 11 are connected to the readout circuit 80b.

The readout circuit 80a includes a current source unit 20a, a counter 34a, an A/D conversion unit 35a, a reference signal supply unit 38a, a horizontal scanning circuit 50a, and an output circuit 70a. The A/D conversion unit 35a includes a comparison unit 30a and a memory unit 33a. The comparison unit 30a includes a plurality of differential input comparators 36a, and the memory unit 33a includes a plurality of memories 37a. The reference signal supply unit 38a includes a reference signal generating circuit 31a and a reference signal switching circuit 32a.

The current source unit 20a supplies a current to the vertical signal lines V-1, ..., V-(n−1). Each of the vertical signal lines V-1, ..., V-(n−1) is input to one input terminal of each of the plurality of comparators 36a. The reference signal generating circuit 31a outputs a reference signal having a voltage that changes as time progresses with a predetermined change rate. The reference signal can be, for example, a ramp signal having a voltage that linearly changes as time progresses. The reference signal switching circuit 32a switches the change rate per time of the reference signal that is output from the reference signal generating circuit 31a. Specifically, the reference signal switching circuit 32a is a circuit configured to select one value among a plurality of change rates per time, change the change rate per time of the input reference signal to the selected value, and output the changed change rate per time. The reference signal that is output from the reference signal switching circuit 32a is input to other input terminal of each of the plurality of comparators 36a. Each of the comparators 36a compares the voltage of the vertical signal line and the voltage of the reference signal, and outputs a signal designating the magnitude relationship therebetween.

In the circuit illustrated in FIG. 1, the reference signal supply unit 38a is divided into two groups, that is, the reference signal generating circuit 31a and the reference signal switching circuit 32a. However, such division of function is not essential. Specifically, it is enough that the reference signal supply unit 38a has the function of selectively supplying a reference signal having one change rate per time among a plurality of change rates per time to the A/D conversion unit 35a. For example, one circuit may realize the function, or three or more circuits may realize the function.

The counter 34a outputs, to the memory unit 33a, a count value that is obtained by counting clock pulses. When the level of a signal that is output from each of the comparators 36a changes, the count value at that time is held as digital data in the memory 37a corresponding to the comparator 36a. In this way, A/D conversion of analog signals that are output from the pixels 11 is performed. The digital data for the respective columns stored in the memory unit 33a is transferred in sequence to the output circuit 70a based on a control signal that is output from the horizontal scanning circuit 50a. The output circuit 70a performs arithmetic operation of the input digital data and outputs the result to the outside of the readout circuit 80a. In this way, the readout circuit 80a outputs signals based on light entering the pixels 11 arranged in the odd-numbered columns in the pixel array 10.

The readout circuit 80b has a configuration similar to that of the readout circuit 80a, and thus, description thereof is omitted. Similarly to the readout circuit 80a, the readout circuit 80b outputs signals based on light entering the pixels 11 arranged in the even-numbered columns in the pixel array 10.

The TG 40 generates and supplies a clock signal or a timing signal necessary for operation of the reference signal generating circuits 31a and 31b, the reference signal switching circuits 32a and 32b, the counters 34a and 34b, the horizontal scanning circuits 50a and 50b, the vertical scanning circuit 60, or the like.

Figure 2:
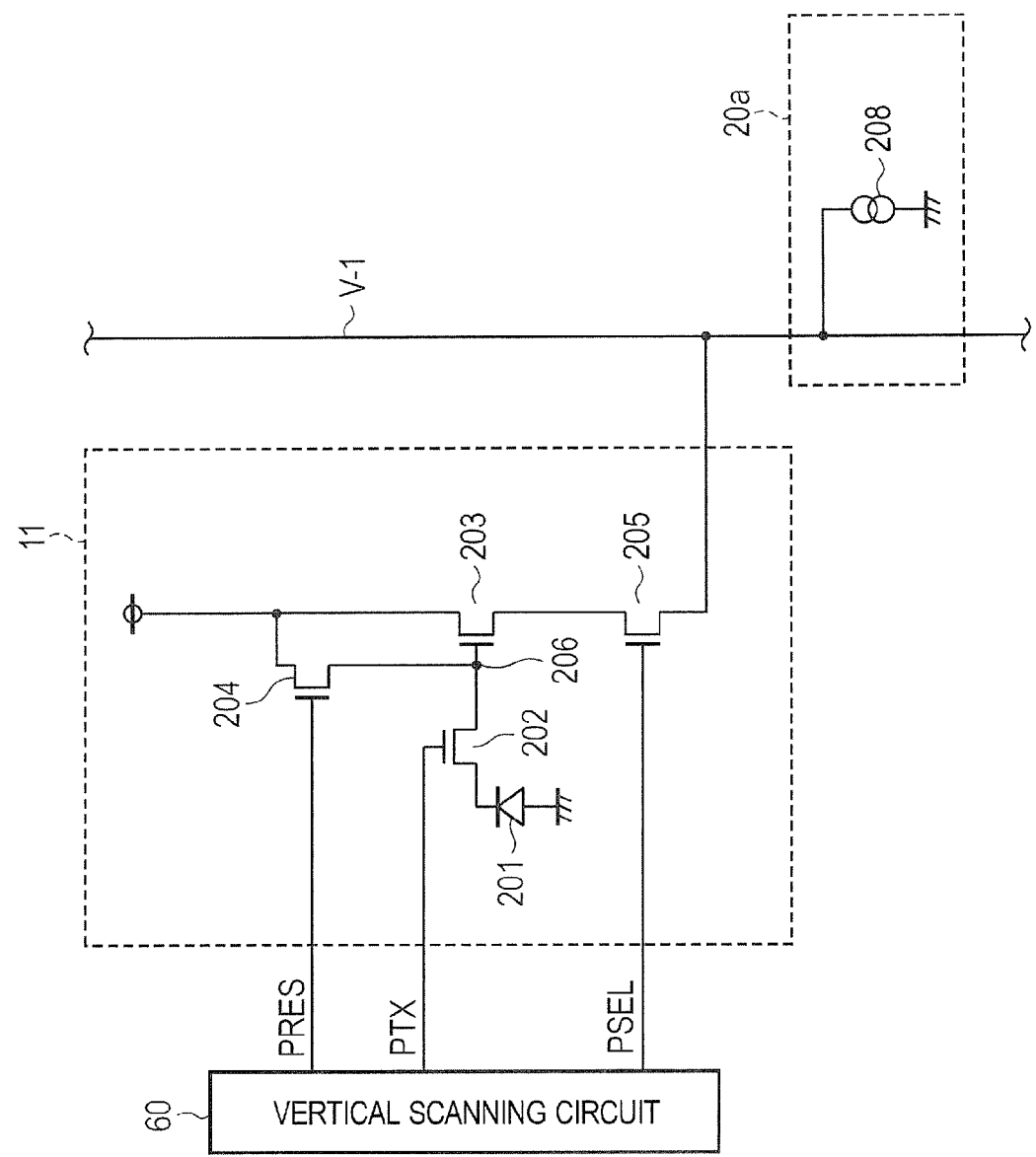
FIG. 2 is an illustration of the configuration of a pixel according to the first embodiment.

FIG. 2 is an illustration of a configuration of a pixel according to the first embodiment. In the description below, a pixel in the first column is focused on and a configuration thereof is described, but other pixels have a similar configuration. The pixel 11 includes a photodiode (PD) 201, a transfer transistor 202, an amplifier transistor 203, a reset transistor 204, and a select transistor 205. Each of the transistors is a MOS transistor. In the following, the transistors are described as NMOS transistors, but the transistors may be PMOS transistors. Control signals PTX, PRES, and PSEL are input to gates of the transfer transistor 202, the reset transistor 204, and the select transistor 205, respectively.

The PD 201 is a photoelectric converter configured to generate charge corresponding to incident light through photoelectric conversion. An anode of the PD 201 is grounded, and a cathode of the PD 201 is connected to a source of the transfer transistor 202. A drain of the transfer transistor 202 is connected to a floating diffusion (FD) 206 serving as a gate node of the amplifier transistor 203. A source of the reset transistor 204 is connected to the FD 206, and a power supply voltage is input to a drain of the reset transistor 204. The power supply voltage is also input to a drain of the amplifier transistor 203, and a source of the amplifier transistor 203 is connected to a drain of the select transistor 205. A source of the select transistor 205 is connected to a vertical signal line V-1. A current source 208 arranged in the current source unit 20a is connected to the vertical signal line V-1. The current source 208 supplies a bias current to the amplifier transistor 203. In this way, a source follower amplifier including the amplifier transistor 203 and the current source 208 is formed. In other words, a voltage based on a potential of the FD 206 is output to the vertical signal line V-1.

In the pixel 11, a reset signal Vn can be output to the vertical signal line V-1 through putting the reset transistor 204 into a conductive state and resetting the FD 206. Further, in the pixel 11, the transfer transistor 202 can be put into a connecting state to transfer charge accumulated in the PD 201 to the FD 206. At this time, a pixel signal Vs serving as a signal in which a photoelectric conversion signal is superimposed on the reset signal is output to the vertical signal line V-1. The select transistor 205 has the function of selecting a row from which the signal is output through control of electrical connection between the amplifier transistor 203 and the vertical signal line V-1.

Figure 3:
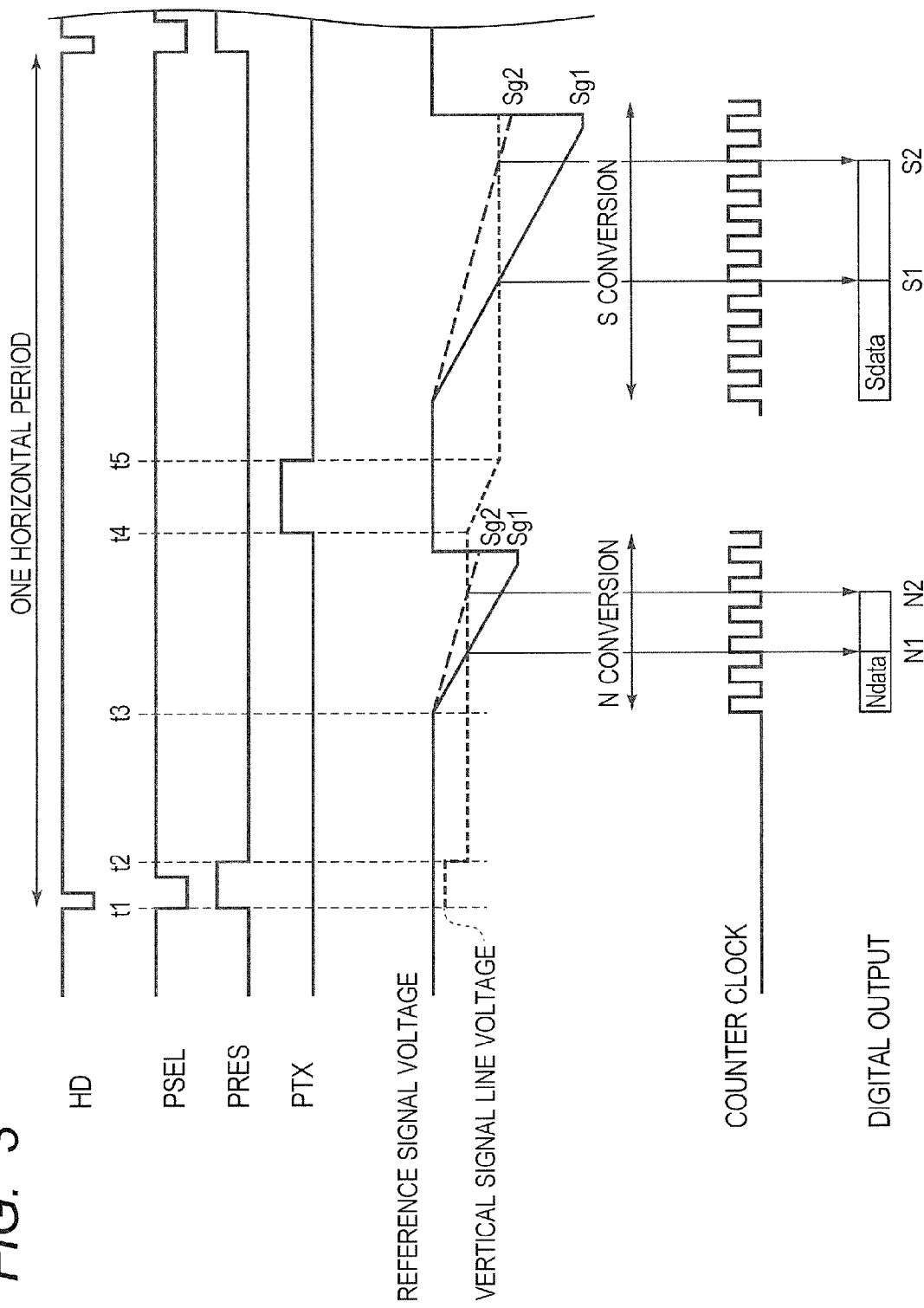
FIG. 3 is a timing chart for illustrating operation of the imaging apparatus in one horizontal period according to the first embodiment.

FIG. 3 is a timing chart for illustrating operation of the imaging apparatus in one horizontal period (for one pixel row) according to the first embodiment. In FIG. 3, there are illustrated operation timings of a control signal HD designating a start timing of a horizontal period, and of the control signals PSEL, PRES, and PTX for controlling operation of the respective columns of the pixel 11. In FIG. 3, there are further illustrated a voltage that is output to vertical signal lines V-1, . . . , V-n, a voltage of the reference signal that is output from the reference signal switching circuits 32a and 32b, a counter clock, and digital output.

First, at Time t1, the control signal PRES shifts to HIGH level, the reset transistor 204 is put into the conductive state, and the FD 206 is reset. After that, the control signal PSEL shifts to HIGH level, the select transistor 205 is put into the conductive state, and a voltage based on the potential of the FD 206 is output to each of the vertical signal lines V-1, . . . , V-n.

At Time t2, the control signal PRES shifts to LOW level and the reset transistor 204 is put into a non-conductive state. This outputs a voltage corresponding to each of the reset signal Vn to the vertical signal lines V-1, . . . , V-n via the amplifier transistor 203.

In a period from Time t3, first A/D conversion (N conversion) of the reset signal Vn is performed. Specifically, the voltage of the reset signal Vn that is read out in each of the vertical signal lines V-1, . . . , V-n is input to the comparators 36a and 36b to be compared with the voltage of the reference signal. In this embodiment, the voltage of the reference signal at the time of the A/D conversion is a ramp signal that has an amplitude Sg1 or Sg2 and that is lowered as time progresses. In other words, the change rate per time of the voltage of the reference signal is determined by the amplitude Sg1 or Sg2. When the magnitude relationship between the voltage of the reset signal Vn and the voltage of the reference signal is inverted, the output of the comparators 36a and 36b is changed from HIGH to LOW, or from LOW to HIGH. For example, when the amplitude of the reference signal is Sg1, a counter value N1 that is output from the counters 34a and 34b is stored in the memory units 33a and 33b as first digital data at a timing at which the output of the comparators 36a and 36b changes.

Then, second A/D conversion of the pixel signal is performed. At Time t4, the control signal PTX shifts to HIGH level and the transfer transistor 202 is put into the conductive state. After that, at Time t5, the control signal PTX shifts to LOW level and the transfer transistor 202 is put into the non-conductive state. This transfers the charge accumulated in the PD 201 to the FD 206, a signal based on the transferred charge is superimposed on the reset signal Vn, and the signal is output to each of the vertical signal lines V-1, . . . , V-n as the pixel signal Vs.

Similarly to the case of the first A/D conversion of the reset signal Vn, the second A/D conversion (S conversion) of the pixel signal Vs is performed. For example, when the amplitude of the ramp signal is Sg1, a counter value S1 that is output from the counters 34a and 34b is stored in the memory units 33a and 33b as second digital data at a timing at which the output potential of the comparators 36a and 36b is inverted.

The first and second digital data stored in the memory units 33a and 33b of the respective columns are transferred in sequence to the output circuits 70a and 70b by the horizontal scanning circuits 50a and 50b. The output circuits 70a and 70b perform arithmetic operation for obtaining a difference between the first digital data and the second digital data. This can reduce the influence of noise due to variations in characteristics of the transistors forming the pixels and variations in characteristics of the comparators 36a and 36b of the respective columns. A modification may be made such that the arithmetic operation for obtaining the difference is performed not by the output circuits 70a and 70b but by a signal processing unit provided outside of the imaging apparatus 100.

The values of the digital data obtained in the first and second A/D conversions described above are determined by a signal that is output from the pixel, and the slope of the reference signal. Here, for example, when the amplitude of the reference signal is multiplied by 0.5 and the amplitude is changed from Sg1 to Sg2 (=0.5×Sg1), the slope of the reference signal becomes 0.5 times as large. When the A/D conversion is performed using the reference signal having the amplitude Sg2 obtained in this way, digital data to be obtained are N2=2×N1 and S2=2×S1, which are twice as much. This corresponds to a doubling of a gain, and thus, by changing the amplitude of the reference signal, gain up at the time of the A/D conversion can be attained.

Figure 4A:
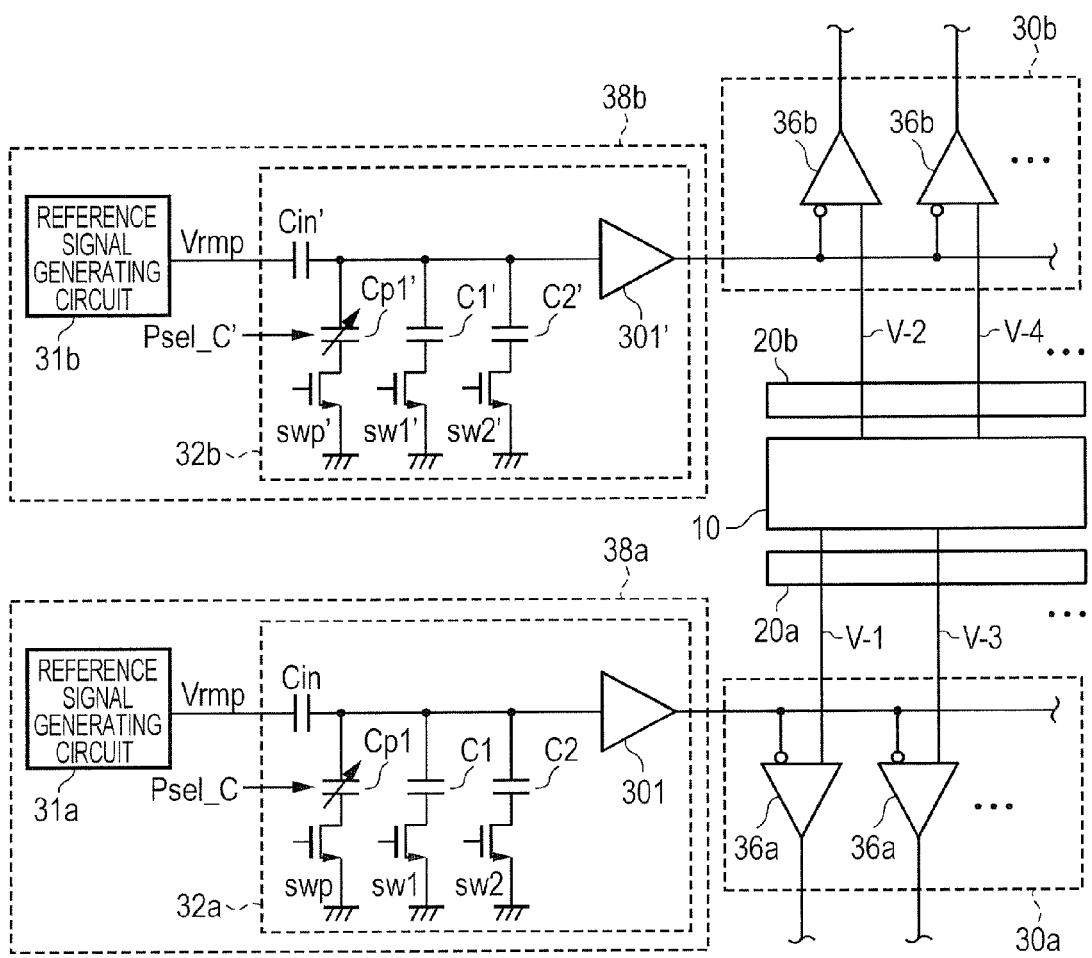
FIG. 4A is an illustration of a configuration of a reference signal switching circuit according to the first embodiment.
Figure 4B:
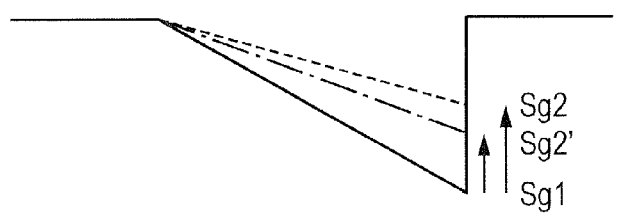
FIG. 4B is an explanatory diagram of a difference in slope of a reference signal.

FIG. 4A is an illustration of a configuration of the reference signal supply units 38a and 38b according to the first embodiment of the present invention. FIG. 4B is an explanatory diagram of a difference in slope of the reference signal. In this embodiment, the reference signal switching circuit 32a arranged in the readout circuit 80a includes a buffer 301, an input capacitor Cin, capacitors C1 and C2 for gain switching, a variable capacitor Cp1, and switches sw1, sw2, and swp. Each of the switches is an NMOS transistor configured to be put into the connecting state or the disconnecting state depending on a control signal that is input to the gate thereof, but is not limited thereto. The variable capacitor Cp1 is an element having a capacitance value that changes depending on a control signal Psel_C.

The input capacitor Cin is connected between the reference signal generating circuit 31a and an input terminal of the buffer 301. One terminal of each of the capacitors C1 and C2 for gain switching and one terminal of the variable capacitor Cp1 are further connected to a node between the input capacitor Cin and the input terminal of the buffer 301. Another terminal of the capacitor C1 for gain switching and another terminal of the capacitor C2 for gain switching are connected to drains of the switches sw1 and sw2, respectively. Another terminal of the variable capacitor Cp1 is connected to a drain of the switch swp. Sources of the switches sw1, sw2, and swp are grounded. An output terminal of the buffer 301 is connected to one of the two input terminals of the plurality of comparators 36a included in the comparison unit 30a.

The reference signal that is input to the input capacitor Cin is input to the input terminal of the buffer 301 via the input capacitor Cin. The voltage of the reference signal is represented by Vrmp. The voltage that is input to the buffer 301 is determined by capacitance division between the input capacitor Cin and the capacitor C1 for gain switching or the capacitor C2 for gain switching. Therefore, by changing a capacitance division ratio through controlling the connecting state or disconnecting state of the switches sw1 and sw2, the voltage that is input to the comparators 36a can be switched. In the description below, the voltage that is output from the buffer 301 is the same as the input voltage (that is, a gain of 1), but the buffer 301 may be replaced by an amplifier circuit configured to give a gain other than 1, and may be replaced by an inverting amplifier circuit configured to give a negative gain.

For example, when both the capacitance value of the input capacitor Cin and the capacitance value of the capacitor C1 for gain switching are a capacitance value C, by putting all the switches sw1, sw2, and swp into the disconnecting state, the amplitude Sg1 corresponding to the gain of 1 is obtained. By putting the switch sw1 into the connecting state and putting the switches sw2 and swp into the disconnecting state, the amplitude Sg2 corresponding to a gain of 2 is obtained. In other words, the reference signal supply unit 38a can selectively output, as a first reference signal, a reference signal having a first change rate per time corresponding to the amplitude Sg1 or a reference signal having a second change rate per time corresponding to the amplitude Sg2. Those amplitudes Sg1 and Sg2 are expressed as follows.

$$Sg1=Vrmp \quad (1)$$

$$Sg2=Vrmp \times (Cin/(Cin+C1))=Vrmp \times (\tfrac{1}{2}) \quad (2)$$

By changing the amplitude of the reference signal from Sg1 to Sg2 through controlling the switches sw1, sw2, and swp in this way, the slope of the reference signal becomes 0.5 time as large and the value of the digital data obtained by the A/D conversion becomes twice as much. In this case, both the data obtained by the S conversion and the data obtained by the N conversion becomes twice as much.

The reference signal switching circuit 32b has a similar circuit configuration, but reference symbols designating components in the reference signal switching circuit 32b are suffixed with "'". When the amplitude of the reference signal that is output from the reference signal switching circuit 32b and corresponds to the gain of 1 is represented by Sg1', and the amplitude of the reference signal that is output from the reference signal switching circuit 32b and corresponds to the gain of 2 is represented by Sg2', those amplitudes are expressed, similarly to Expression (1) and Expression (2), as follows.

$$Sg1'=Vrmp \quad (3)$$

$$Sg2'=Vrmp \times (Cin'/(Cin'+C1')) \quad (4)$$

In other words, the reference signal supply unit 38b can selectively output, as a second reference signal, a reference signal having a third change rate per time corresponding to the amplitude Sg1' or a reference signal having a fourth change rate per time corresponding to the amplitude Sg2'.

When the input capacitor Cin and the input capacitor Cin' have the same capacitance value, and, at the same time, the capacitor C1 for gain switching and the capacitor C1' for gain switching have the same capacitance value, Sg2 and Sg2' are of the same value. However, due to factors described below, those values may not be of the same value.

The imaging apparatus 100 according to this embodiment is formed on a semiconductor substrate using a semiconductor process technology. The input capacitor Cin and the capacitor C1 for gain switching are included in the readout circuit 80a, and the input capacitor Cin' and the capacitor C1' for gain switching are included in the readout circuit 80b. When the imaging apparatus 100 is formed on the semiconductor substrate, the readout circuit 80a and the readout circuit 80b are often arranged at positions away from each other with the pixel array 10 therebetween. Therefore, variations in parameters that determine capacitance values of the respective capacitor elements, such as the shape of the wirings and the thickness of a dielectric layer, are liable to be large between the readout circuit 80a and the readout circuit 80b. Further, when the readout circuit 80a and the readout circuit 80b are away from each other, the capacitance values of the respective capacitor elements may differ from one another due to difference in element arrangement including peripheral circuits.

Due to those factors, a large difference may be caused between the input capacitor Cin and the input capacitor Cin'. Further, a large difference may also be caused between the capacitor C1 for gain switching and the capacitor C1' for gain switching.

Here, as an example, a case is considered in which the capacitor C1 for gain switching and the capacitor C1' for gain switching have different capacitance values (C1>C1') and the input capacitor Cin and the input capacitor Cin' have the same capacitance value. In this case, from Expression (2) and Expression (4), Sg2≠Sg2'. As illustrated in FIG. 4B, the slope of the reference signal that is output from the reference signal switching circuit 32a and the slope of the reference signal that is output from the reference signal switching circuit 32b are of values different from each other. Therefore, the slope of the reference signal varies among the respective columns. It follows that the digital data obtained and output in the A/D conversion also varies among the respective columns, which may result in noise, e.g., vertical stripes in an image.

According to the configuration of this embodiment, variations in digital data caused due to such factors can be reduced. For example, through putting the switch swp' into the connecting state to connect the variable capacitor Cp1' of the readout circuit 80b, and further, adjusting the capacitance value of the variable capacitor Cp1', variations in slope of the reference signal can be corrected. This correcting method is now described.

When the switch swp' is put into the connecting state and the variable capacitor Cp1' is connected to the node leading to the input terminal of the buffer 301', Sg2' is expressed by Expression (5).

$$Sg2' = Vrmp \times (Cin'/(Cin' + C1' + Cp1'))  \qquad (5)$$

At this time, when the capacitance value of the variable capacitor Cp1' in Expression (5) is selected by the control signal Psel_C' so that Expression (6) is satisfied, Sg2≈Sg2'.

$$Cp1' \approx C1 - C1'  \qquad (6)$$

This reduces variations in output digital data and reduces noise in the image. Therefore, according to this embodiment, an imaging apparatus is provided that can improve the precision of the A/D conversion and that can pick up an image with higher precision.

When, in contrast to the example above, the capacitor C1' for gain switching has a capacitance value that is larger than that of the capacitor C1 for gain switching (C1'>C1), the correcting method according to this embodiment is also applicable. Specifically, through putting the switch swp into the connecting state to connect the variable capacitor Cp1 of the readout circuit 80a, and further, adjusting the capacitance value of the variable capacitor Cp1, variations in slope of the reference signal can be corrected.

As described above, the variable capacitor Cp1 and the switch swp, or the variable capacitor Cp1' and the switch swp' function as an adjusting unit configured to reduce the difference in value between Sg2 and Sg2'.

In the two cases described above, both the variable capacitor Cp1 and the variable capacitor Cp1' may be used to make the adjustment.

In the above description, a case is described in which the gain is selected from 1 and 2, but variations in slope of the reference signal can be corrected even when a still higher gain is selected. For example, when the capacitance value of the capacitor C2 for gain switching is represented by 2 C and the capacitor C1 for gain switching and the capacitor C2 for gain switching are used as a combined capacitor, the slope of the voltage Vrmp of the reference signal becomes ¼, and thus, the gain can be four times. Also in this case, similarly to the above-mentioned case, variations in slope of the reference signal can be corrected using at least one of the variable capacitor Cp1 or the variable capacitor Cp1'.

Further, even when the amplitudes of the reference signals corresponding to the lower gain side are such that Sg1≠Sg1' due to a factor, e.g., process variations of the reference signal generating circuit 31a and the reference signal generating circuit 31b, variations in slope of the reference signal can be corrected similarly. This also can reduce a difference in value between Sg1 and Sg1' similarly.

In the above description, a case is described in which the capacitor C1 for gain switching and the capacitor C1' for gain switching have different capacitance values and the input capacitor Cin and the input capacitor Cin' have the same capacitance value, but the present invention is not limited thereto. For example, even when the capacitor C1 for gain switching and the capacitor C1' for gain switching have the same capacitance value and the input capacitor Cin and the input capacitor Cin' have different capacitance values, the adjusting method according to this embodiment is applicable. Further, even when the capacitor C1 for gain switching and the capacitor C1' for gain switching have different capacitance values, and at the same time, the input capacitor Cin and the input capacitor Cin' have different capacitance values, the adjusting method according to this embodiment is applicable.

Next, an exemplary method of determining specific capacitance values of the variable capacitors Cp1 and Cp1' in the adjusting method described above is described. First, a predetermined voltage (signal value) (hereinafter referred to as first analog signal) is supplied to the vertical signal lines V-1, . . . , V-n. A/D conversion of the first analog signal is performed by the A/D conversion unit 35a using the reference signal corresponding to the amplitude Sg1 to obtain a first digital signal. Then, the reference signal is switched to the one corresponding to the amplitude Sg2 and A/D conversion is performed by the A/D conversion unit 35a to obtain a second digital signal.

Further, A/D conversion of the first analog signal is performed by an A/D conversion unit 35b using the reference signal corresponding to the amplitude Sg1' to obtain a third digital signal. Then, the reference signal is switched to the one corresponding to the amplitude Sg2' and A/D conversion is performed by the A/D conversion unit 35b to obtain a fourth digital signal. In this way, for one analog signal, the first to fourth digital signals can be obtained.

In this case, when the amplitude Sg1 and the amplitude Sg1' are the same, ideally, the first digital signal and the third digital signal are the same. However, when there is a difference between the amplitude Sg1 and the amplitude Sg1', the first digital signal and the third digital signal have different values. Therefore, at least one of the variable capacitors Cp1 or Cp1' is adjusted based on the first digital signal and the third digital signal so that a difference between the variable capacitors Cp1 and Cp1' may be reduced, more preferably, may be eliminated. This can reduce the difference between the amplitude Sg1 and the amplitude Sg1'. Similarly, a difference between the amplitude Sg2 and the amplitude Sg2' can be adjusted based on the second digital signal and the fourth digital signal.

This adjusting method is only exemplary, and the present invention is not limited thereto. For example, the adjustment may be made based on actual measurement of any one of the slopes of the reference signals, the capacitance values of the capacitors, the characteristics of an element for process inspection, or the like. The adjustment may also be made based on an image picked up using the imaging apparatus 100 or an imaging system including the same.

Further, the reference signal switching circuits 32a may be arranged in the respective columns so as to correspond to the comparators 36a in the respective columns. In this case, the reference signal generating circuit 31a outputs the reference signal having the first change rate per time and the reference signal having the second change rate per time that is smaller than the first change rate per time to the reference signal switching circuit 32a of each of the columns at the same time. The reference signal that is supplied by the reference signal switching circuit 32a of each of the columns to the corresponding comparator 36a is switched to any one of the reference signal having the first change rate per time and the reference signal having the second change rate per time.

Further, the reference signal switching circuits 32b may also be arranged in the respective columns so as to correspond to the comparators 36b in the respective columns. In this case, the reference signal generating circuit 31b outputs the reference signal having the third change rate per time and the reference signal having the fourth change rate per time that is smaller than the third change rate per time to the reference signal switching circuit 32b of each of the columns at the same time. The reference signal that is supplied by the reference signal switching circuit 32b of each of the columns to the corresponding comparator 36b is switched to any one of the reference signal having the third change rate per time and the reference signal having the fourth change rate per time.

As described above, when the reference signal switching circuits 32a and 32b are arranged correspondingly to the comparators 36a and 36b for the respective columns, before the S conversion is performed, the comparators 36a and 36b for the respective columns compare the pixel signal Vs that is output to the corresponding vertical signal lines V-n with a predetermined threshold value. When the result of the comparison indicates that the pixel signal Vs is larger than the predetermined threshold value, the reference signal switching circuits 32a and 32b for the respective columns output the reference signal having the first change rate per time or the third change rate per time to the corresponding comparators 36a and 36b. On the other hand, when the result of the comparison indicates that the pixel signal Vs is smaller than the predetermined threshold value, the reference signal switching circuits 32a and 32b for the respective columns output the reference signal having the second change rate per time or the fourth change rate per time to the corresponding comparators 36a and 36b. This enables, in the S conversion, the comparators 36a and 36b for the respective columns to make a comparison with the reference signal corresponding to the amplitude of the pixel signal Vs that is output to the corresponding vertical signal lines V-n.

Second Embodiment

Figure 5:
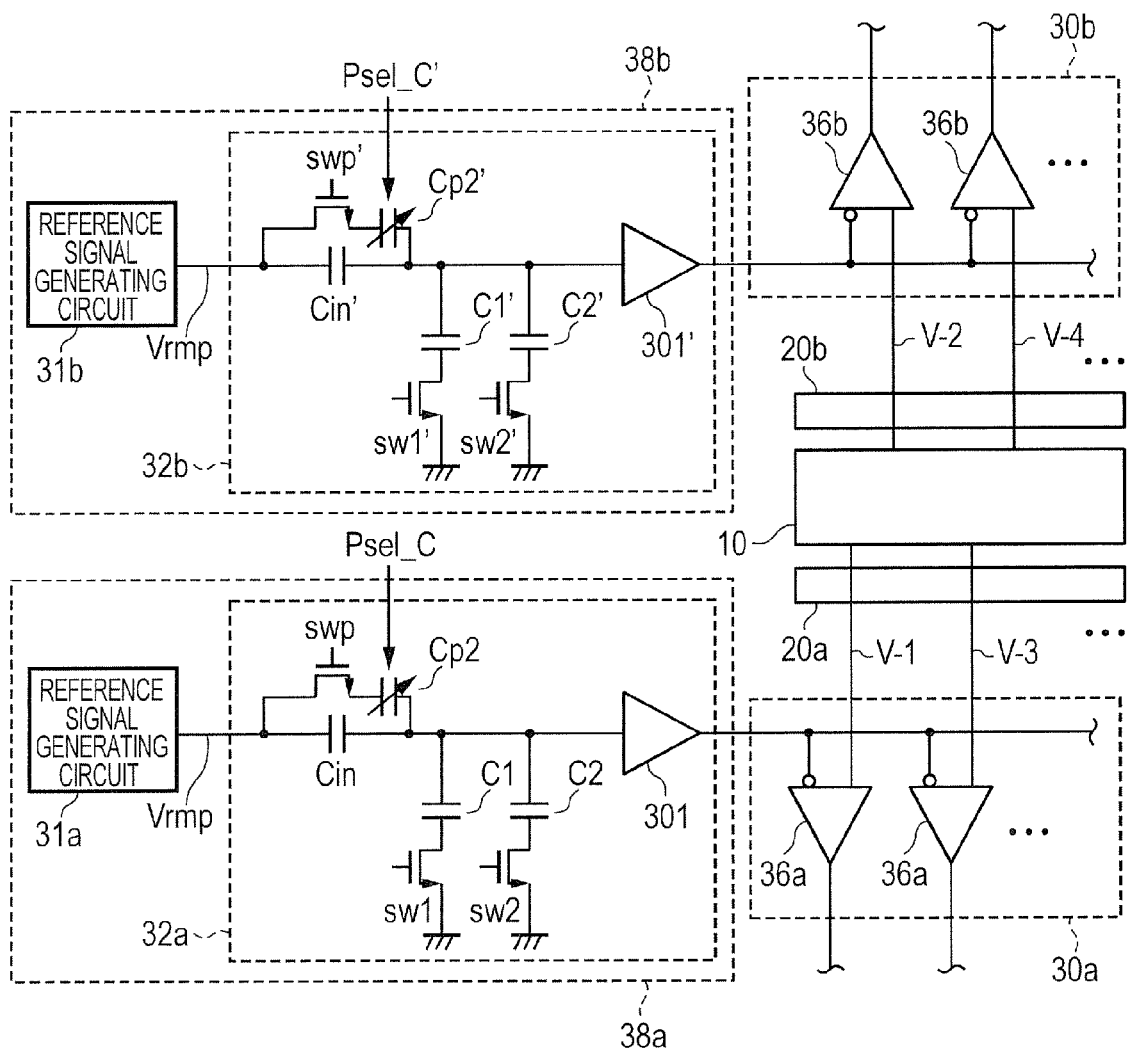
FIG. 5 is an illustration of a configuration of a reference signal switching circuit according to a second embodiment of the present invention.

FIG. 5 is an illustration of a configuration of the reference signal supply units 38a and 38b according to a second embodiment of the present invention.

This embodiment is different from the first embodiment in that, instead of the variable capacitor Cp1 that can be connected in parallel to the capacitors C1 and C2 for gain switching of the reference signal supply unit 38a, a variable capacitor Cp2 can be connected in parallel to the input capacitor Cin. Specifically, in the reference signal switching circuit 32a, the drain of the switch swp is connected to one terminal of the input capacitor Cin, and the source of the switch swp is connected to one terminal of the variable capacitor Cp2. Another terminal of the variable capacitor Cp2 is connected to another terminal of the input capacitor Cin.

When the switch swp is in the disconnecting state, that is, when the variable capacitor Cp2 is not connected in parallel to the input capacitor Cin, the amplitudes Sg1, Sg1', Sg2, and Sg2' are similar to those expressed in Expression (1) to Expression (4) in the first embodiment, and thus, description thereof is omitted.

Now, a case is considered in which the input capacitor Cin and the input capacitor Cin' have different capacitance values (Cin<Cin') due to factors similar to those in the first embodiment and in which the capacitor C1 for gain switching and the capacitor C1' for gain switching have the same capacitance value (C1=C1'). In this case, from Expression (2) and Expression (4), Sg2≠Sg2'. A correcting method in this case is now described.

When the switch swp is put into the connecting state and the variable capacitor Cp1 is connected to the node leading to the input terminal of the buffer 301, Sg2' and Sg2 are expressed by Expression (7) and Expression (8).

$$Sg2'=V\text{rmp} \times (Cin'/(Cin'+C1'))=V\text{rmp} \times (\tfrac{1}{2}) \tag{7}$$

$$Sg2=V\text{rmp} \times (Cin+Cp2)/(Cin+Cp2+C1) \tag{8}$$

At this time, when the capacitance value of the variable capacitor Cp2 in Expression (8) is selected by the control signal Psel_C so that Expression (9) is satisfied, Sg2≈Sg2'. This reduces variations in output digital data and reduces noise in the image. Therefore, the configuration according to this embodiment can also obtain an effect similar to that of the first embodiment.

$$Cp2 \approx Cin' - Cin \tag{9}$$

According to this embodiment, the variable capacitor Cp2 is connected only to the reference signal generating circuit 31a to correct variations in slope of the reference signal, but both the variable capacitor Cp2 and the variable capacitor Cp2' may be used to make the adjustment.

Further, for example, even when the amplitudes of the reference signals corresponding to the lower gain side are such that Sg1≠Sg1' due to a factor, e.g., process variations of the reference signal generating circuit 31a and the reference signal generating circuit 31b, variations in slope of the reference signal can be corrected similarly.

Variations may occur between the input capacitors Cin and Cin', between the capacitors C1 and C1' for gain switching, and between the capacitors C2 and C2' for gain switching. Therefore, through combining the first embodiment and the second embodiment so that the imaging apparatus 100 may include both the variable capacitors Cp1 and Cp1' and the variable capacitors Cp2 and Cp2', variations in slope of the reference signal can be corrected more easily.

Third Embodiment

Figure 6A:
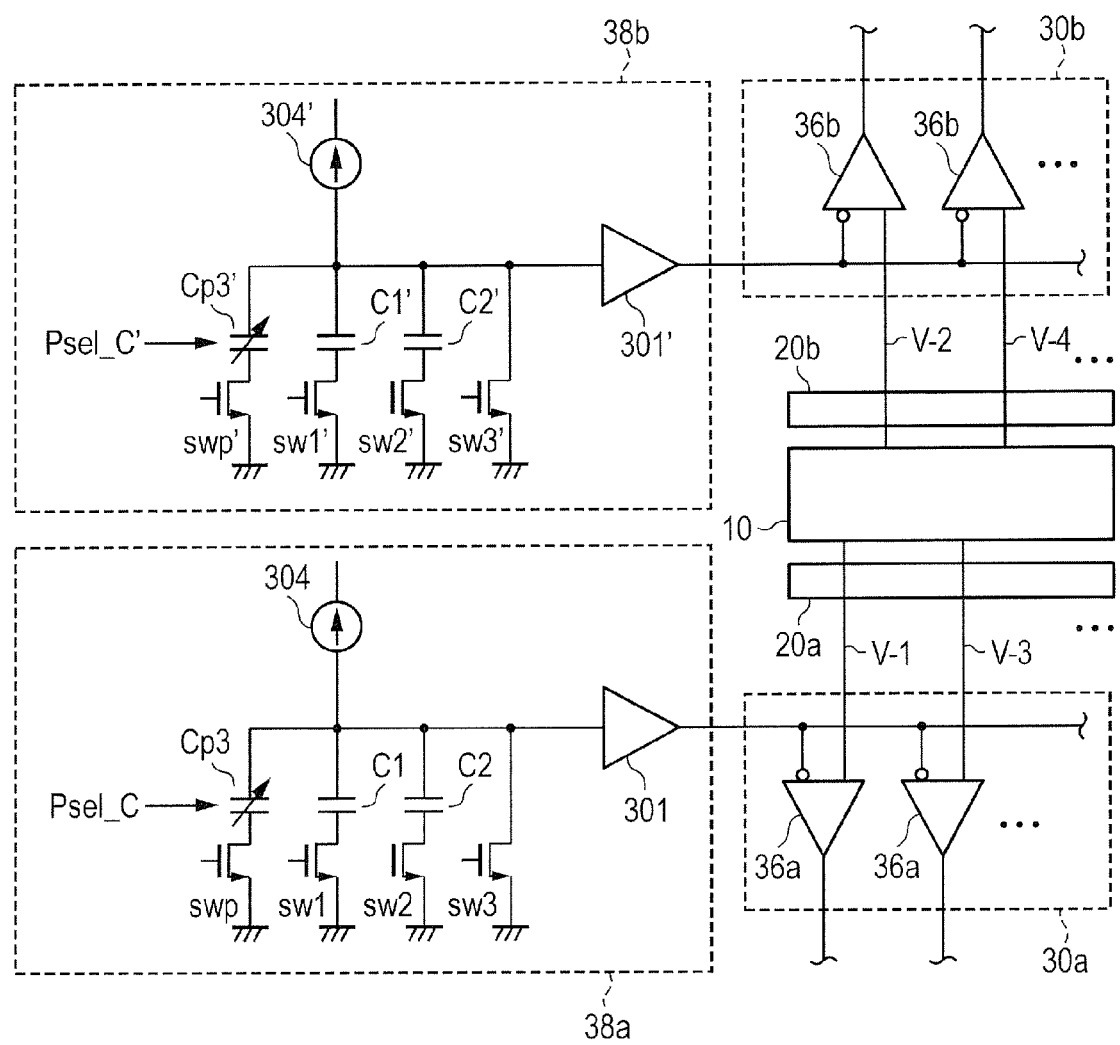
FIG. 6A is an illustration of a configuration of a reference signal switching circuit according to a third embodiment of the present invention.
Figure 6B:
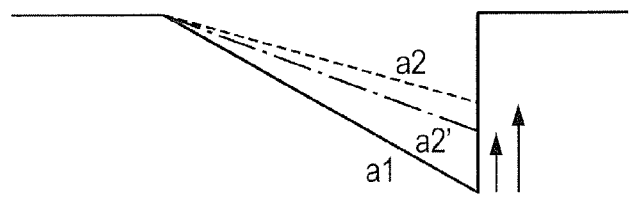
FIG. 6B is an explanatory diagram of a difference in slope of a reference signal.

FIG. 6A is an illustration of a configuration of the reference signal supply units 38a and 38b according to a third embodiment of the present invention. FIG. 6B is an explanatory diagram of a difference in slope of the reference signal. In the reference signal supply units 38a and 38b according to this embodiment, the function of the reference signal generating circuits 31a and 31b and the function of the reference signal switching circuits 32a and 32b described in the first and second embodiments are integrated.

This embodiment is different from the first embodiment in that, instead of the reference signal generating circuits 31a and 31b and the input capacitors Cin and Cin', current sources 304 and 304' are arranged, and further, switches sw3 and sw3' are added. The current sources 304 and 304' are connected to input terminals of the buffers 301 and 301', respectively. The switches sw3 and sw3' are used for resetting voltages at the nodes leading to the input terminals of the buffers 301 and 301', respectively, at a ground voltage. During a period in which the A/D conversion is performed, the switches sw3 and sw3' are in the disconnecting state, and thus, in the description below, the switches sw3 and sw3' are assumed to be in the disconnecting state.

The reference signal supply unit 38a is described. The current source 304 supplies a charging current I having a fixed value to the capacitors such as the capacitors C1 and C2 for gain switching to accumulate charge in those capacitors. This generates a reference signal that changes depending on a charging time. When a capacitance value that is the sum of the capacitance values of the capacitor elements, the voltage of the reference signal, and the charging current are represented by C, V, and I, respectively, a slope (change rate per time) a of the reference signal is expressed by Expression (10).

$$a = dV/dt = I/C \tag{10}$$

In other words, the slope a of the reference signal is directly proportional to the charging current I and is inversely proportional to the capacitance value C. For example, a case is considered in which the capacitance values of the capacitors C1 and C2 for gain switching have a relationship of C1=C2. The slope of the reference signal that is output from the reference signal supply unit 38a when the switch sw1 is in the connecting state and the switches sw2 and swp are in the disconnecting state is represented by a1. The slope of the reference signal that is output from the reference signal supply unit 38a when the switches sw1 and sw2 are in the connecting state and the switch swp is in the disconnecting state is represented by a2. In this case, the slopes a1 and a2 of the reference signal that is output from the reference signal supply unit 38a, that is, gains a1 and a2, are expressed by Expression (11) and Expression (12).

$$a1=(I/C1) \tag{11}$$

$$a2=(I/(C1+C2))=a1\times(½) \tag{12}$$

Therefore, the slope of the reference signal can be switched to a1 or a2 through setting the charging current I at a fixed value and controlling the connection relationship of the capacitors C1 and C2 for gain switching. For example, when the slope of the reference signal is changed from a1 to a2, the digital data obtained by the A/D conversion becomes twice as much. In this case, both the data obtained by the S conversion and the data obtained by the N conversion becomes twice as much.

The reference signal supply unit 38b has a similar circuit configuration, but reference symbols designating elements in the reference signal supply unit 38b are suffixed with "'". When a charging current supplied from the current source 304' connected to the reference signal supply unit 38b is represented by I', slopes a1' and a2' of the reference signal that is output from the reference signal supply unit 38b, that is, gains a1' and a2', are expressed by Expression (13) and Expression (14).

$$a1'=(I'/C1') \tag{13}$$

$$a2'=(I'/(C1'+C2'))=a1'\times(½) \tag{14}$$

Here, a case is considered in which, due to a factor similar to that in the first embodiment, the capacitors C1 and C1' for gain switching have different capacitance values (C1<C1'). In this case, from Expression (11), Expression (13), Expression (12), and Expression (14), the slopes are such that a1≠a1' and a2≠a2'. As an exemplary correcting method in this case, a method in which a1≈a1' is attained is now described.

When the switch swp is put into the connecting state and the variable capacitor Cp3 is connected to the node leading to the input terminal of the buffer 301, a1 is expressed by Expression (15).

$$a1=(I/(C1+Cp3)) \tag{15}$$

At this time, when the capacitance value of the variable capacitor Cp3 in Expression (15) is selected by the control signal Psel_C so that Expression (16) is satisfied, a1≈a1'. This reduces variations in output digital data and reduces noise in the image. Therefore, the configuration according to this embodiment can also obtain an effect similar to that of the first and second embodiments.

$$Cp3=C1'-C1 \tag{16}$$

According to this embodiment, the variable capacitor Cp3 is connected only to the reference signal supply unit 38a to correct variations in slope of the reference signal, but a variable capacitor Cp3' may be used to make the adjustment, and both the variable capacitor Cp3 and the variable capacitor Cp3' may be used to make the adjustment.

Further, variations in the slopes a2 and a2' of the reference signals corresponding to the higher gain side can also be corrected similarly.

Further, in the above description, variations in slope of the reference signal is corrected using the variable capacitors Cp3 and Cp3', but a modification may be made such that, through changing at least one of the values of the charging currents I or I' that are output by the current sources 304 and 304', respectively, variations in slope of the reference signal is corrected. In other words, through setting the current sources 304 and 304' as a variable current source, the current sources 304 and 304' may function as adjusting units configured to correct variations in slope of the reference signal.

Figure 7:
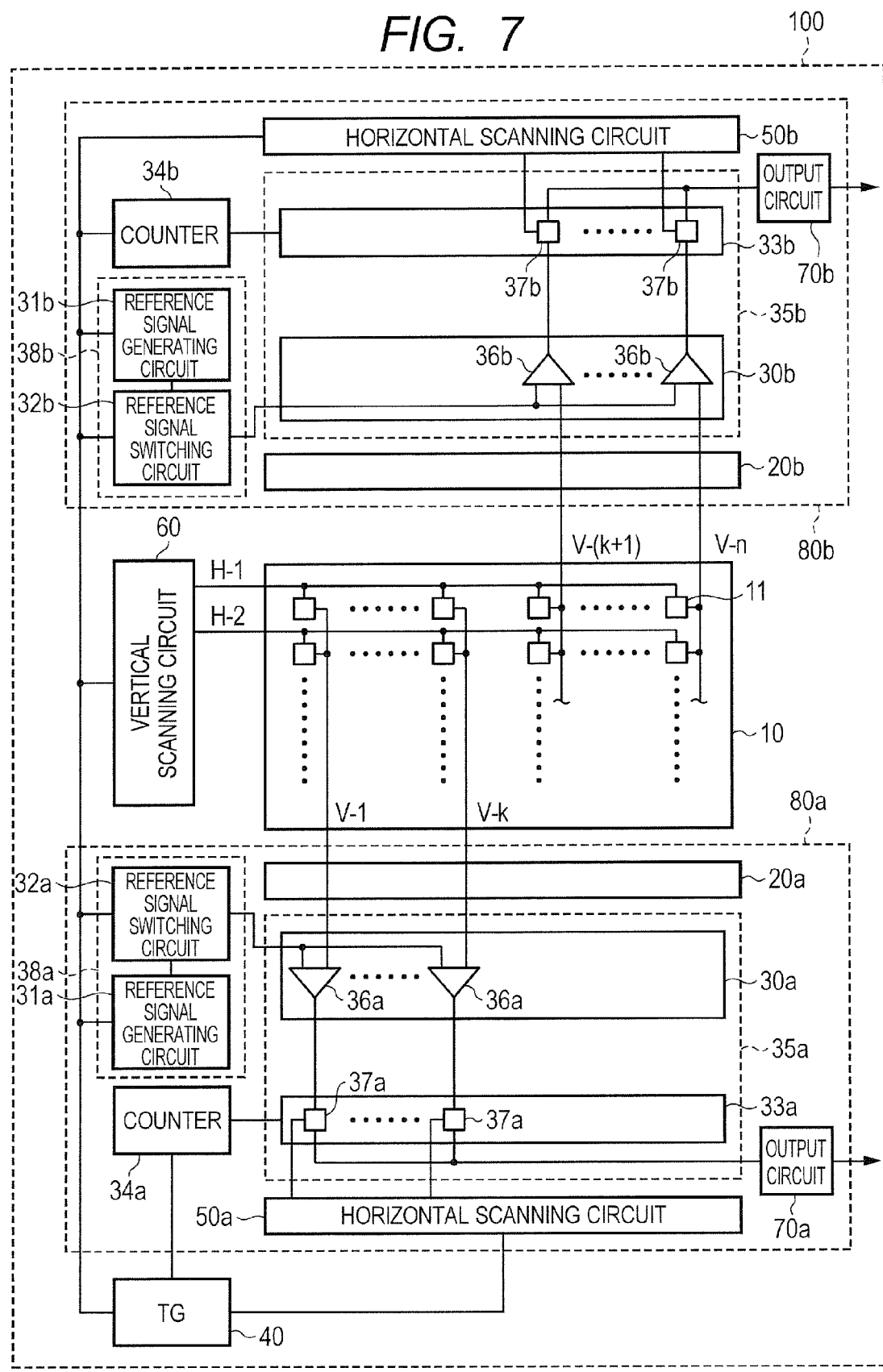
FIG. 7 is an illustration of a modified configuration of an imaging apparatus according to the first to third embodiments.

According to the first to third embodiments, the vertical signal lines V-1, . . . , V-(n-1) connected to the odd-numbered columns of the pixels 11 are connected to the readout circuit 80a, while the vertical signal lines V-2, . . . , V-n connected to the even-numbered columns of the pixels 11 are connected to the readout circuit 80b. However, the present invention is not limited to this configuration. For example, as illustrated in FIG. 7, the pixel array 10 is divided into two regions, that is, a region from the first column to the k-th column (left side region) and a region from the (k+1)th column to the n-th column (right side region). In other words, each of the left side region and the right side region includes a plurality of continuous columns in the pixel array 10. In this case, the vertical signal lines V-1, . . . , V-k connected to the pixels 11 in the left side region may be connected to the readout circuit 80a, while the vertical signal lines V-(k+1), . . . , V-n connected to the pixels 11 in the right side region may be connected to the readout circuit 80b.

Fourth Embodiment

Figure 8:
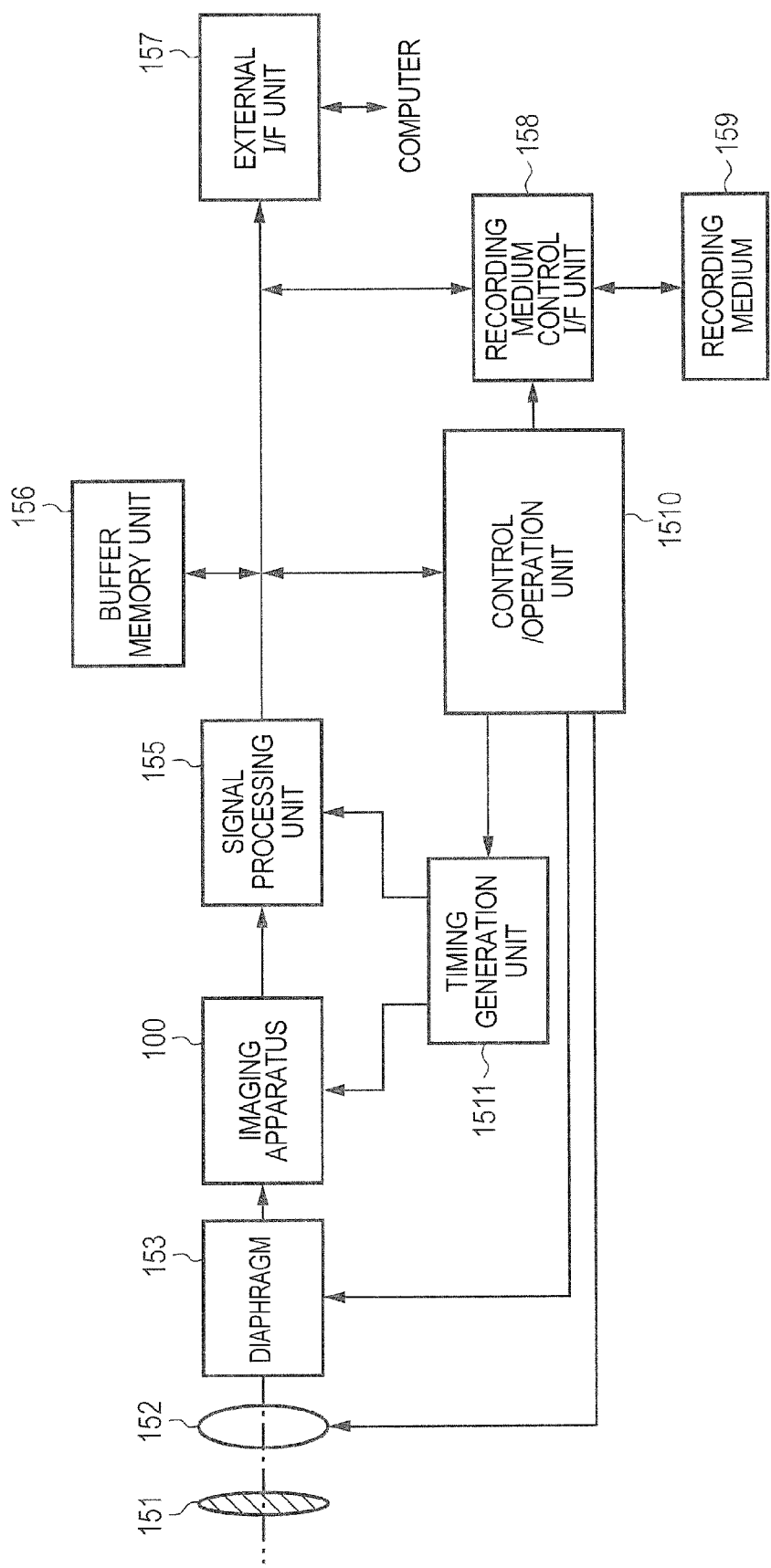
FIG. 8 is an illustration of a configuration of an imaging system according to a fourth embodiment of the present invention.

The imaging apparatus according to each of the embodiments described above is applicable to various kinds of imaging systems. Exemplary imaging systems include a digital still camera, a digital camcorder, and a surveillance camera. FIG. 8 is a block diagram of an imaging system in which the imaging apparatus according to any one of the embodiments described above is applied to a digital still camera as an example of an imaging system according to a fourth embodiment of the present invention.

The imaging system illustrated as an example in FIG. 8 includes the imaging apparatus 100, a barrier 151 configured to protect a lens 152, the lens 152 configured to form an optical image of a subject on the imaging apparatus 100, and a diaphragm 153 configured to change the amount of light passing through the lens 152. The lens 152 and the diaphragm 153 form an optical system configured to introduce light into the imaging apparatus 100. The imaging apparatus 100 is any one of the imaging apparatus 100 according to the embodiments described above. Further, the imaging system illustrated as an example in FIG. 8 includes a signal processing unit 155 configured to process an output signal that is output from the imaging apparatus 100. The signal processing unit 155 generates an image based on a signal that is output from the imaging apparatus 100. Specifically, the signal processing unit 155 performs, in addition, various kinds of correction and compression as necessary before outputting image data. The signal processing unit 155 may further have the function of detecting a focal point using a signal that is output from the imaging apparatus 100.

The imaging system illustrated in FIG. 8 further includes a buffer memory unit 156 configured to temporarily store image data and an external interface unit (external I/F unit) 157 configured to communicate to/from an external computer or the like. The imaging system further includes a recording medium 159, e.g., a semiconductor memory, configured to store and read imaging data, and a recording medium control interface unit (recording medium control I/F unit) 158 configured to store data in and read data from the recording medium 159. The recording medium 159 may be built in the imaging system, or may be detachable therefrom.

The imaging system further includes a control/operation unit 1510 configured to perform various arithmetic operations and to control the entire digital still camera, and a timing generation unit 1511 configured to output various kinds of timing signals to the imaging apparatus 100 and to the signal processing unit 155. In this case, the timing signals or the like may be input from the outside. It is enough that the imaging system includes at least the imaging apparatus 100 and the signal processing unit 155 configured to process an output signal that is output from the imaging apparatus 100.

As described above, the imaging system according to this embodiment can perform imaging operation with the imaging apparatus 100 applied thereto.

Embodiments to which the present invention is applied are not limited to the first to fourth embodiments described above, and various modifications are possible. For example, any two or more of the configurations in the first to fourth embodiments may be selected and combined.

Further, the imaging system described in the fourth embodiment is only an exemplary imaging system to which the imaging apparatus according to the present invention can be applied, and imaging systems to which the imaging apparatus according to the present invention can be applied are not limited to the configuration illustrated in FIG. 8.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-121766, filed Jun. 17, 2015, which is hereby incorporated by reference herein in its entirety.

What is claimed is:

1. An imaging apparatus, comprising:
a pixel array including a plurality of pixels arranged in rows and columns;
a first A/D conversion unit, which is arranged correspondingly to a first group of the columns of the pixels in the pixel array, and is configured to perform A/D conversion of an analog signal that is output from each of the corresponding pixels to a digital signal by comparing the analog signal with a first reference signal having a potential that changes with a predetermined change rate per time;
a second A/D conversion unit, which is arranged correspondingly to a second group of the columns of the pixels in the pixel array, and is configured to perform A/D conversion of an analog signal that is output from each of the corresponding pixels to a digital signal by comparing the analog signal with a second reference signal having a potential that changes with a predetermined change rate per time;
a first reference signal supply unit configured to supply, to the first A/D conversion unit, as the first reference signal, at least one of a reference signal having a first change rate per time and a reference signal having a second change rate per time that is smaller than the first change rate;
a second reference signal supply unit configured to supply, to the second A/D conversion unit, as the second reference signal, at least one of a reference signal having a third change rate per time and a reference signal having a fourth change rate per time that is smaller than the third change rate; and
an adjusting unit configured to adjust at least one of the first change rate, the second change rate, the third change rate, and the fourth change rate so that at least one of a difference in change rate per time between the first change rate and the third change rate, and a difference in change rate per time between the second change rate and the fourth change rate is reduced.

2. The imaging apparatus according to claim 1, wherein the difference in change rate per time between the first change rate and the third change rate and the difference in change rate per time between the second change rate and the fourth change rate are differences due to at least one of process variations of the first reference signal supply unit and the second reference signal supply unit and a difference in element arrangement between the first reference signal supply unit and the second reference signal supply unit.

3. The imaging apparatus according to claim 1,
wherein the first reference signal supply unit is configured to change a gain of the A/D conversion performed by the first A/D conversion unit through selecting the change rate per time of the first reference signal that the first reference signal supply unit supplies, and
wherein the second reference signal supply unit is configured to change a gain of the A/D conversion performed by the second A/D conversion unit through selecting the change rate per time of the second reference signal that the second reference signal supply unit supplies.

4. The imaging apparatus according to claim 1,
wherein the first group of the columns in the pixel array corresponding to the first A/D conversion unit is odd-numbered columns in the pixel array, and
wherein the second group of the columns in the pixel array corresponding to the second A/D conversion unit is even-numbered columns in the pixel array.

5. The imaging apparatus according to claim 1, wherein each of the first group of the columns in the pixel array corresponding to the first A/D conversion unit and the second group of the columns in the pixel array corresponding to the second A/D conversion unit is a plurality of continuous columns included in the pixel array.

6. The imaging apparatus according to claim 1,
wherein each of the first reference signal supply unit and the second reference signal supply unit comprises a first capacitor and a second capacitor, which are configured to change, by capacitance division, the change rate per time of the reference signal supplied by each of the first reference signal supply unit and the second reference signal supply unit, and
the adjusting unit comprises a variable capacitor connected in parallel to one of the first capacitor and the second capacitor.

7. The imaging apparatus according to claim 1,
wherein each of the first reference signal supply unit and the second reference signal supply unit comprises:
a first capacitor;
a second capacitor; and
a current source configured to generate a voltage that changes depending on a charging time in the first capacitor and the second capacitor through supplying a current to the first capacitor and the second capacitor, and
wherein the adjusting unit comprises a variable capacitor that is connected in parallel to one of the first capacitor and the second capacitor.

8. The imaging apparatus according to claim 1,
wherein each of the first reference signal supply unit and the second reference signal supply unit comprises:
a first capacitor;
a second capacitor; and
a current source configured to generate a voltage that changes depending on a charging time in the first capacitor and the second capacitor through supplying a current to the first capacitor and the second capacitor,
wherein the current source is a variable current source capable of changing a value of the current supplied by one of the current source of the first reference signal supply unit and the current source of the second reference signal supply unit, and
wherein the adjusting unit comprises the current source.

9. The imaging apparatus according to claim 1,
wherein the first A/D conversion unit is configured to:
generate a first digital signal through A/D conversion of a first analog signal having a predetermined signal value through use of the reference signal supplied from the first reference signal supply unit and having the first change rate; and
generate a second digital signal through A/D conversion of the first analog signal through use of the reference signal supplied from the first reference signal supply unit and having the second change rate,
wherein the second A/D conversion unit is configured to:
generate a third digital signal through A/D conversion of the first analog signal through use of the reference signal supplied from the second reference signal supply unit and having the third change rate; and
generate a fourth digital signal through A/D conversion of the first analog signal through use of the reference signal supplied from the second reference signal supply unit and having the fourth change rate, and
wherein the adjusting unit is configured to adjust at least one of the first change rate, the second change rate, the third change rate, and the fourth change rate based on the first digital signal, the second digital signal, the third digital signal, and the fourth digital signal.

10. The imaging apparatus according to claim 9, wherein the adjusting unit is configured to adjust at least one of the first change rate, the second change rate, the third change rate, and the fourth change rate so that at least one of a difference in signal value between the first digital signal and the third digital signal and a difference in signal value between the second digital signal and the fourth digital signal is reduced.

11. The imaging apparatus according to claim 1, further comprising:
a first switching circuit; and
a second switching circuit,
wherein the first reference signal supply unit is configured to supply, to the first switching circuit, the reference signal having the first change rate and the reference signal having the second change rate,
wherein the second reference signal supply unit is configured to supply, to the second switching circuit, the reference signal having the third change rate and the reference signal having the fourth change rate,
wherein each of the first A/D conversion unit and the second A/D conversion unit is configured to compare the analog signal that is output from a corresponding pixel with a predetermined threshold value,
wherein the first switching circuit is configured to supply, when a result of the comparison by the first A/D conversion unit between the analog signal and the predetermined threshold value indicates that the analog signal has an amplitude that is larger than the predetermined threshold value, the reference signal having the first change rate to the first A/D conversion unit,
wherein the first switching circuit is configured to supply, when the result of the comparison by the first A/D conversion unit between the analog signal and the predetermined threshold value indicates that the analog signal has an amplitude that is smaller than the predetermined threshold value, the reference signal having the second change rate to the first A/D conversion unit,
wherein the second switching circuit is configured to supply, when a result of the comparison by the second A/D conversion unit between the analog signal and the predetermined threshold value indicates that the analog signal has an amplitude that is larger than the predetermined threshold value, the reference signal having the third change rate to the second A/D conversion unit, and
wherein the second switching circuit is configured to supply, when the result of the comparison by the second A/D conversion unit between the analog signal and the predetermined threshold value indicates that the analog signal has an amplitude that is smaller than the predetermined threshold value, the reference signal having the fourth change rate to the second A/D conversion unit.

12. An imaging system, comprising:
an imaging apparatus; and
a signal processing unit configured to generate an image based on a signal output from the imaging apparatus,
wherein the imaging apparatus comprises:
- a pixel array including a plurality of pixels arranged in rows and columns;
- a first A/D conversion unit, which is arranged correspondingly to a first group of the columns of the pixels in the pixel array, and is configured to perform A/D conversion of an analog signal that is output from each of the corresponding pixels to a digital signal by comparing the analog signal with a first reference signal having a potential that changes with a predetermined change rate per time;
- a second A/D conversion unit, which is arranged correspondingly to a second group of the columns of the pixels in the pixel array, and is configured to perform A/D conversion of an analog signal that is output from each of the corresponding pixels to a digital signal by comparing the analog signal with a second reference signal having a potential that changes with a predetermined change rate per time;
- a first reference signal supply unit configured to supply, to the first A/D conversion unit, as the first reference signal, at least one of a reference signal having a first change rate per time and a reference signal having a second change rate per time that is smaller than the first change rate;
- a second reference signal supply unit configured to supply, to the second A/D conversion unit, as the second reference signal, at least one of a reference signal having a third change rate per time and a reference signal having a fourth change rate per time that is smaller than the third change rate; and
- an adjusting unit configured to adjust at least one of the first change rate, the second change rate, the third change rate, and the fourth change rate so that at least one of a difference in change rate per time between the first change rate and the third change rate, and a difference in change rate per time between the second change rate and the fourth change rate is reduced.

* * * * *